Patented Sept. 5, 1933

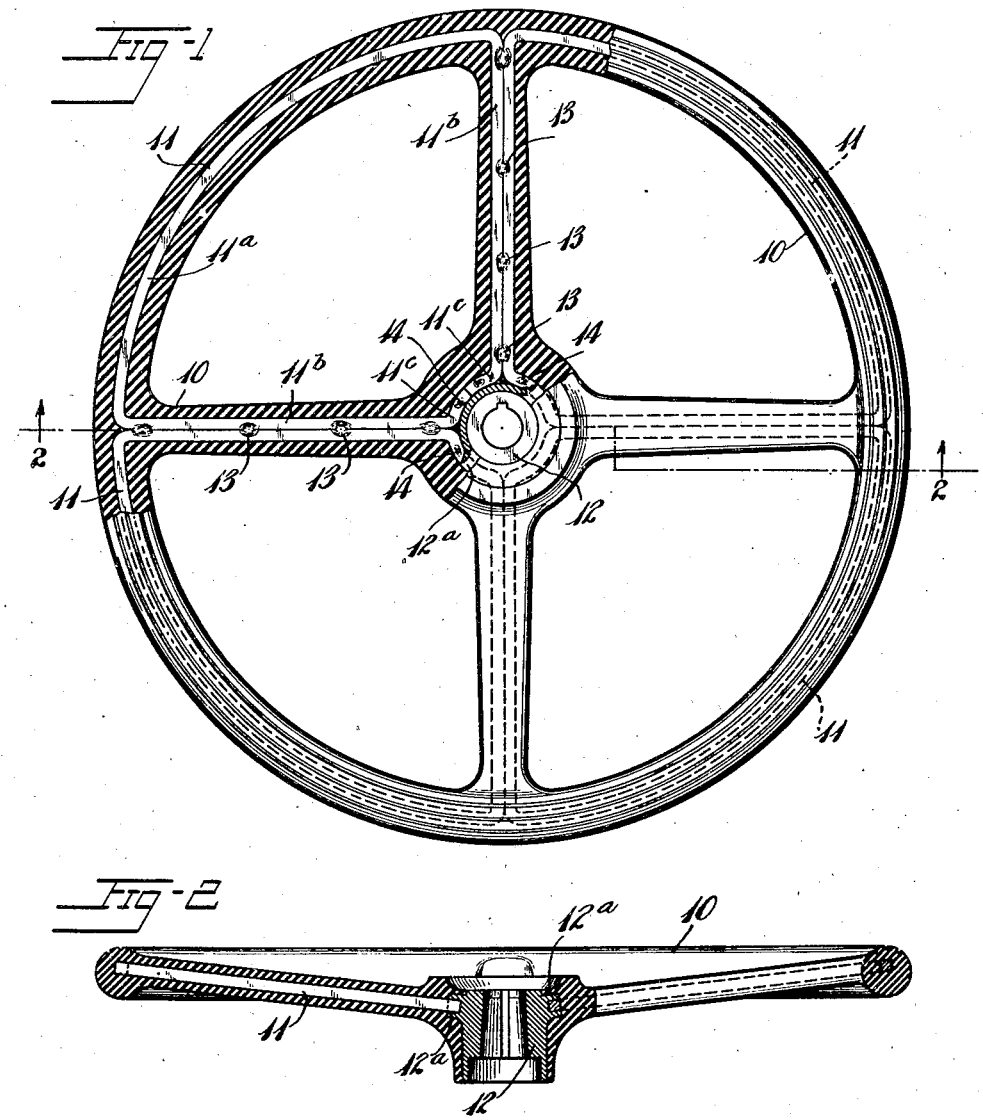

1,925,887

UNITED STATES PATENT OFFICE 1,925,887

STEERING WHEEL AND METHOD OF MAKING THE SAME

Harry E. Wamer, Akron, Ohio, assignor to The B. F. Goodrich Company, New York, N. Y., a corporation of New York Application November 14, 1928
Serial No. 319,297

6 Claims. (Cl. 29—159)

This invention relates to steering wheels such as commonly are used with motor-propelled vehicles and to methods of making the same, and especially it relates to steering wheels composed of molded material such as hard rubber or the like and provided with internal reinforcement of metal.

The chief object of the invention is to provide a steering wheel of the character mentioned with an improved reinforcing structure; to provide for economy of material in manufacture of the reinforcing structure; and to provide a reinforcing structure which easily is molded into a steering wheel structure without entrapping air therein. More specifically I aim to provide a steering wheel with a reinforcing structure of ample strength which may be manufactured substantially without waste or scrap material. Economies of time and labor and the reduction of cost of the wheel also are contemplated.

Of the accompanying drawing:

Fig. 1 is a plan view of a steering wheel embodying my invention in its preferred form, a part being in section.

Fig. 2 is a section on line 2—2 of Fig. 1.

Referring to the drawing, I show an annular steering wheel structure of which 10 is a body portion of molded material such as hard rubber or the like, and 11, 11 are metal reinforcing sectors embedded in said body portion and the spokes thereof and secured, adjacent the axis of the wheel, in a circumferential groove formed in the outer periphery of a generally cylindrical metal hub-reinforcing member 12.

Each reinforcing sector 11 comprises an arcuate outer peripheral portion $11^a$ disposed within the rim portion of the wheel, integral radial portions $11^b$, $11^b$ at the ends of said arcuate portion disposed within the spokes of the wheel, and arcuate inner peripheral portions $11^c$, $11^c$ formed by the respective ends of the radial portions $11^b$ which are directed toward each other and preferably have their ends abutting as shown. The end portions $11^c$ of the sectors 11 are mounted in a peripheral groove in the hub-reinforcing member 12, which groove is defined by a pair of spaced-apart radial flanges $12^a$, $12^a$.

The sectors 11 are formed of strong steel wires or strips which preferably are rectangular or square in cross-section so that in the assembled reinforcing structure the radial portions $11^b$ of adjacent sectors will lie flush with each other, with the result that there are no grooves or spaces between adjacent radial portions where air is likely to be entrapped during the molding of the wheel structure around the reinforcing structure. Rigidity of the spider in the region where the rim portion joins the spoke portion is contributed in a large measure by the non-devious form of these portions in the bent strip, and this desirably causes prying strains to be taken in approximately equal parts at the two ends of the spoke portion instead of excessively at the juncture of spoke and hub as would occur if the before-mentioned rim and spoke portions were of a devious form such as to lack adequate rigidity in the region of the juncture of the rim and spoke portions.

The several sectors 11 are united with each other to form a unitary structure preferably by spot welding along their adjacent radial portions $11^b$ as indicated at 13, 13, Fig. 1, and the inner peripheral portions $11^c$ of the sectors are spot welded, as at 14, 14 to the hub-flanges $12^a$, $12^a$.

The arrangement provides twice as much reinforcement in the spokes of the wheel as there is in the rim, thus providing greatest strength at the regions of greatest strain.

Since the steel wire or strip material for the sectors 11 may be provided in long or continuous lengths, it will be obvious that the material for individual sectors may be cut therefrom in the exact lengths desired and there is no material wasted.

The reinforcement is of simple construction and the wheel may be manufactured by simple molding methods whereby the other objects set forth in the foregoing statement of objects are effected.

My invention may be modified within the scope of the appended claims.

I claim:

1. A wheel comprising a body structure of molded material and a plurality of reinforcing members therein, each reinforcing member comprising a piece of strip metal of substantially uniform cross-section bent to provide non-devious rim-reinforcing and spoke reinforcing portions integral with each other, the rim-reinforcing portions of the several members constituting together a full-circle rim-reinforcement.

2. A wheel comprising a body structure of molded material and a plurality of reinforcing members therein, each reinforcing member comprising a piece of strip metal of substantially uniform cross-section bent to provide non-devious rim-reinforcing and spoke-reinforcing portions integral with each other, the rim-reinforcing portions of the several members constituting together a full-circle rim-reinforcement, and each of the said reinforcing members being directly secured to another of the same.

3. The method of making a wheel which comprises bending a plurality of metal strips of substantially uniform cross-section to form each of the same with a non-devious rim-reinforcing and a non-devious spoke-reinforcing portion integral with each other, assembling the bent strips and directly securing them one to another in the form of a wheel, and molding a body of material upon the assembly.

4. A steering wheel comprising a sub-structure including a metal hub member, a series of endless segmental members of wire provided with inner arcuate portions fitting about and secured to the hub member, radial portions positioned adjacent each other in adjoining segments to provide spokes and outer arcuate portions at the rim of the wheel, and a molded covering over said substructure.

5. A wheel comprising a body structure of molded material and a plurality of reinforcing members therein, each reinforcing member comprising a piece of strip metal of substantially uniform cross-section bent to provide non-devious rim-reinforcing and spoke-reinforcing portions integral with each other, the rim-reinforcing portions of the several members constituting together a full-circle rim-reinforcement, and each of the said reinforcing members being welded to another of the same.

6. The method of making a wheel which comprises bending a plurality of metal strips of substantially uniform cross-section to form each of the same with a non-devious rim-reinforcing and non-devious spoke-reinforcing portion integral with each other, assembling the bent strips and directly securing them one to another by welding in the form of a wheel, and molding a body of material upon the assembly.

HARRY E. WANER.